(12) United States Patent
Cooper et al.

(10) Patent No.: US 9,045,123 B1
(45) Date of Patent: Jun. 2, 2015

(54) BRAKE SETTING SYSTEM AND METHOD

(71) Applicant: GENERAL ELECTRIC COMPANY, Schenectady, NY (US)

(72) Inventors: Jared Klineman Cooper, Melbourne, FL (US); David Allen Eldredge, Melbourne, FL (US); Robert James Foy, Melbourne, FL (US); Kristopher Ryan Smith, Melbourne, FL (US); Samuel William Golden, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/185,998

(22) Filed: Feb. 21, 2014

(51) Int. Cl.
*B60T 17/22* (2006.01)
*B61H 13/02* (2006.01)

(52) U.S. Cl.
CPC .............. *B60T 17/228* (2013.01); *B61H 13/02* (2013.01)

(58) Field of Classification Search
CPC .......... B60T 8/00; B60T 8/18; B60T 8/1806; B60T 8/1893; B60T 2201/06; B60T 2201/10; B61H 9/00; B61H 9/006; B61H 13/00; B61H 13/02

USPC ...................................................... 701/19, 70
See application file for complete search history.

(56) References Cited

U.S. PATENT DOCUMENTS

| 6,175,784 | B1 | 1/2001 | Jicha | |
|---|---|---|---|---|
| 6,578,679 | B2 | 6/2003 | Hill | |
| 2004/0073342 | A1* | 4/2004 | Kane et al. ...................... | 701/19 |
| 2010/0174428 | A1* | 7/2010 | LeFebvre et al. ................ | 701/19 |
| 2010/0235022 | A1* | 9/2010 | Siddappa et al. ................ | 701/20 |
| 2012/0046811 | A1* | 2/2012 | Murphy et al. .................. | 701/19 |
| 2013/0297163 | A1* | 11/2013 | Kull ................................ | 701/70 |

* cited by examiner

*Primary Examiner* — Jerrah Edwards
*Assistant Examiner* — Tamara Weber
(74) *Attorney, Agent, or Firm* — GE Global Patent Operation; John A. Kramer (57) ABSTRACT

A system may include a vehicle system including at least one vehicle, wherein the at least one vehicle includes at least one handbrake. The system may also include a handbrake setting determination unit configured to determine a handbrake setting control input indicating whether the at least one handbrake is to be set in order to park the vehicle system at a particular location without moving. A handbrake setting suggestion may be based on the handbrake setting control input.

24 Claims, 3 Drawing Sheets

BRAKE SETTING SYSTEM AND METHOD

FIELD

Embodiments of the present disclosure relate to brake systems for vehicles.

BACKGROUND

Known powered vehicle systems may include one or more powered units (for example, locomotives) and one or more non-powered units (for example, freight cars or other rail cars). The powered units supply tractive force to propel the powered units and non-powered units. The non-powered units hold or store goods and/or passengers, and generally are not capable of self-propulsion. For example, some known powered vehicle systems have locomotives and rail cars for conveying goods and/or passengers along a track. Some known powered rail vehicle systems include several powered units. For example, the systems may include a lead powered unit, such as a lead locomotive, and one or more remote powered units, such as trailing locomotives, that are located behind and coupled with the lead powered unit. The lead and remote powered units supply tractive force to propel the system along the track.

The remote powered units may be organized in motive power groups referred to as consists. The lead powered unit can control the tractive efforts of the remote powered units in a consist.

When a powered vehicle system, such as a train, is to be stopped at a particular location, one or more handbrakes of the train are typically set by an operator. In general, train cars and other rail vehicles are required to include handbrake systems. For example, each powered unit, such as a locomotive, may include a handbrake, and each non-powered unit, such as a freight car, includes a separate and distinct handbrake that may be manually engaged by the operator in order to ensure that the train is stopped.

Handbrakes are set in order to prevent a train from moving. Existing regulations require that a train may not hold itself on a grade by using air brakes alone. When a particular grade becomes too steep for the handbrakes of a locomotive to hold the train in a stopped or parked position, an operator is typically required to leave the locomotive to set handbrakes on one or more of the non-powered units, such as freight cars. When a train is parked on a grade, if an operator does not set a sufficient number of handbrakes, the train may begin to roll down the grade, pick up speed, and cause damage to the train and/or surrounding area. If the train picks up enough speed, the train may derail and/or crash into one or more other vehicles that happen to be on tracks in front of the train.

Accordingly, train operators are responsible for securing standing or parked trains with handbrakes to prevent undesired movement. Before the operators leave a train unattended, a sufficient number of handbrakes are to be set to ensure that the train remains securely parked. After setting the handbrakes, the operators typically check to ensure that the force exerted by the handbrakes is sufficient to ensure that the train remains stationary, whether on a level surface or a graded incline. For example, after setting the handbrakes, an operator may release air brakes of a train to see if the train begins to move. If the train remains stationary, the operator may then determine that a sufficient number of handbrakes have been set. If, however, the train begins to move, the operator may then set additional handbrakes.

As can be appreciated, the process of determining a number of handbrakes to set and then verifying that the train is in fact securely stopped and parked may be time and labor intensive. Further, the process is generally determined by human operators, and may be subject to human error. As such, a system and method for more accurately determining a number of handbrakes to set is desirable.

BRIEF DESCRIPTION

Certain embodiments of the present disclosure provide a system that may include a vehicle system including at least one vehicle, wherein the at least one vehicle includes at least one handbrake. The vehicle system may include a handbrake setting determination unit configured to determine a handbrake setting control input indicating whether at least one handbrake of a vehicle system is to be set in order to park the vehicle system at a particular location without the vehicle system moving. For example, a handbrake setting suggestion may be based on the handbrake setting control input. In at least one embodiment, the handbrake setting determination unit may be configured to determine the handbrake setting control input, such as a handbrake setting suggestion, indicating whether the handbrake(s) is to be set in order to safely park the vehicle system at the particular location.

In at least one embodiment, the handbrake setting determination unit is configured to determine the handbrake setting suggestion based on one or more data parameters including one or both of position data or vehicle data of the vehicle system. For example, the position data may include a position of the vehicle system along a route, and the vehicle data may include one or more of a weight, length, and/or number of vehicles of the vehicle system. As another example, the position data may include a grade of a surface on which the vehicle system is positioned.

The system may also include an energy management system in communication with the handbrake setting determination unit. The energy management system may be configured to provide one or more data parameters of the vehicle system to the handbrake setting determination unit. The handbrake setting determination unit may be configured to determine the handbrake setting suggestion based on the one or more data parameters.

In at least one embodiment, the handbrake setting determination unit is configured to output the handbrake setting suggestion to an operator and request acknowledgement of the handbrake setting suggestion. For example, the handbrake setting suggestion may be output as a text message on a monitor or other display device, or as an audio signal broadcast through a speaker.

In at least one embodiment, the handbrake setting determination unit is configured to determine a decision of an operator as to whether the operator intends to follow or decline the handbrake setting suggestion. The handbrake setting determination unit may be configured to store the decision of the operator in a memory, which may be part of the handbrake setting determination unit.

In at least one embodiment, the handbrake setting determination unit may be configured to determine whether an operator has actually followed the handbrake setting suggestion. For example, the system may include a communication device in communication with the handbrake setting determination unit and the at least one handbrake. The handbrake setting determination unit may be configured to communicate with the at least one handbrake through the communication device to determine whether the at least one handbrake has been set.

In at least one embodiment, the handbrake setting determination unit may be configured to prompt an operator to verify that the handbrake setting suggestion is sufficient to safely park the vehicle system at the particular location. For example, the operator may be prompted to run an engine at a particular forward speed and/or release air brakes with the handbrakes set to determine whether the vehicle system moves. If the vehicle system does not move, the handbrake setting suggestion is sufficient to safely park the vehicle system at the particular location.

In at least one embodiment, the vehicle system includes a train. The at least one vehicle may include at least one powered locomotive and at least one freight or passenger car. In at least one embodiment, the at least one powered locomotive includes a lead locomotive and at least one remote locomotive. The at least one powered locomotive may include first and second powered locomotives of a consist.

The handbrake setting determination unit may be onboard the vehicle system. Alternatively, the handbrake setting determination unit may be remotely located from the vehicle system.

Certain embodiments of the present disclosure provide a method that may include receiving, at a handbrake setting determination unit, one or more data parameters from a vehicle system including at least one vehicle, wherein the at least one vehicle includes at least one handbrake, and determining a handbrake setting control input with the handbrake setting determination unit based on the one or more data parameters. The handbrake setting control input indicates whether the at least one handbrake is to be set in order to park the vehicle system at a particular location without moving. A handbrake setting suggestion may be based on the handbrake setting control input.

In at least one embodiment, a method may include receiving one or more data parameters from a vehicle system including at least one vehicle, wherein the at least one vehicle includes at least one handbrake, using a handbrake setting determination unit to receive the one or more data parameters, and determining a handbrake setting suggestion with the handbrake setting determination unit based on the one or more data parameters. The handbrake setting suggestion indicates whether the at least one handbrake is to be set in order to safely park the vehicle system at a particular location. The determining a handbrake setting suggestion may be based on the one or more data parameters. The one or more data parameters may include one or both of position data or vehicle data of the vehicle system. The position data may include a position of the vehicle system along a route, and the vehicle data may include one or more of a weight, length, and number of vehicles of the vehicle system. The position data may include a grade of a surface on which the vehicle system is positioned.

The method may also include using an energy management system to communicate with the handbrake setting determination unit, and providing one or more data parameters of the vehicle system from the energy management system to the handbrake setting determination unit.

In at least one embodiment, the method may include outputting the handbrake setting suggestion from the handbrake setting determination unit to a monitor or other display device, and using the handbrake setting determination unit to request acknowledgement of the handbrake setting suggestion. In at least one embodiment, the method may include using the handbrake setting determination unit to determine a decision of an operator as to whether the operator intends to follow or decline the handbrake setting suggestion. In at least one embodiment, the decision may be stored in a memory.

In at least one embodiment, the method may include using the handbrake setting determination unit to determine whether an operator has actually followed the handbrake setting suggestion. For example, the method may include communicating with the at least one handbrake through a communication device to determine whether the at least one handbrake has been set.

In at least one embodiment, the method may include using the handbrake setting determination unit to prompt an operator to verify that the handbrake setting suggestion is sufficient to safely park the vehicle system at the particular location.

BRIEF DESCRIPTION OF THE DRAWINGS

The foregoing summary, as well as the following detailed description of certain embodiments of the presently described subject matter, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

The disclosure will be better understood from reading the following description of non-limiting embodiments, with reference to the attached drawings, wherein below.

DETAILED DESCRIPTION

Embodiments of the disclosure relate to a system and method for determining a number of handbrakes to set for a vehicle system, such as a train, in order to ensure that the vehicle system may be safely stopped and parked at a particular position along a route, for example. Although one or more embodiments of the present disclosure may be described in connection with powered rail vehicle systems, the embodiments described herein are not limited to locomotives or to trains. In particular, one or more embodiments may be implemented in connection with different types of rail vehicles (for example, a vehicle that travels on one or more rails, such as single locomotives and railcars, powered ore carts and other mining vehicles, light rail transit vehicles, and the like) and other vehicles and vehicle systems.

The term "vehicle system" may include two or more vehicles that operate together to travel along a route. The term "consist" can refer to a group of vehicles that are mechanically and/or logically linked together to travel along a route. According to various aspects of the disclosure, a consist may be defined based on one or more of the following: mechanical linkages, where vehicles in a consist are mechanically linked and adjacent to at least one other vehicle in the consist; electrical linkages, where vehicles are electrically linked for possibly transferring electrical power between the vehicles; and/or operational/functional linkages, where plural vehicles are controlled in a coordinated manner, for example, certain modes of distributed power operations. As one example, in a rail vehicle context, a locomotive consist may include multiple locomotives that are mechanically (and possibly electrically) linked together, with each locomotive linked and adjacent to at least one other locomotive in the consist. For example, a consist of vehicles, or a vehicle consist, may include two or more vehicles that are mechanically coupled with each other and/or that communicate with each other over one or more wired and/or wireless connections to coordinate control of tractive efforts and/or braking efforts of the vehicles in the consist. A vehicle system can include one or more vehicle consists, such as a train that includes two or more motive power groups formed from two or more locomotives mechanically linked together with each other. The term "lead vehicle" refers to a vehicle that controls operations of one or more vehicles in the vehicle system, and does not necessarily mean the vehicle disposed at a front or leading end of a vehicle system. For example, a lead locomotive in a train may not be disposed at the front end of a train. The term "remote vehicle" refers to a vehicle other than the lead vehicle in a vehicle system. For example, a remote vehicle may include a locomotive that is controlled by a lead locomotive in a train. The term "remote" does not require a predetermined spacing or separation between items. For example, a remote vehicle may be directly coupled with a lead vehicle.

In one or more embodiments described herein, consists of a vehicle system include remote vehicles that are remotely controlled by a lead vehicle of the vehicle system. The consists include communication devices that receive control instructions from the lead vehicle to control tractive efforts and/or braking efforts of the remote vehicles in the consists. The communication devices may be powered by electric current generated by one or more propulsion subsystems of the remote vehicles in the consists. In one embodiment, at least one propulsion subsystem in each consist remains active and in an ON mode of operation to generate electric current to power at least one communication device in the consist when one or more other propulsion subsystems in the same consist are deactivated and switched to an OFF mode of operation. In a consist having two or more vehicles, the propulsion subsystem of at least one vehicle remains in the ON mode of operation to power at least one communication device while the other propulsion subsystems of the other vehicles may turn to the OFF mode of operation. For example, in a consist having two vehicles, one vehicle may turn to the OFF mode of operation while another vehicle remains in or turns to the ON mode of operation. In another example, in a consist having three or more vehicles, at least two of the vehicles may turn to the OFF mode of operation while at least one vehicle turns to or remains in the ON mode of operation. Keeping at least one propulsion subsystem in the ON mode of operation can ensure that one or more communication devices on the consist remain powered and able to communicate with the lead vehicle.

Figure 1:
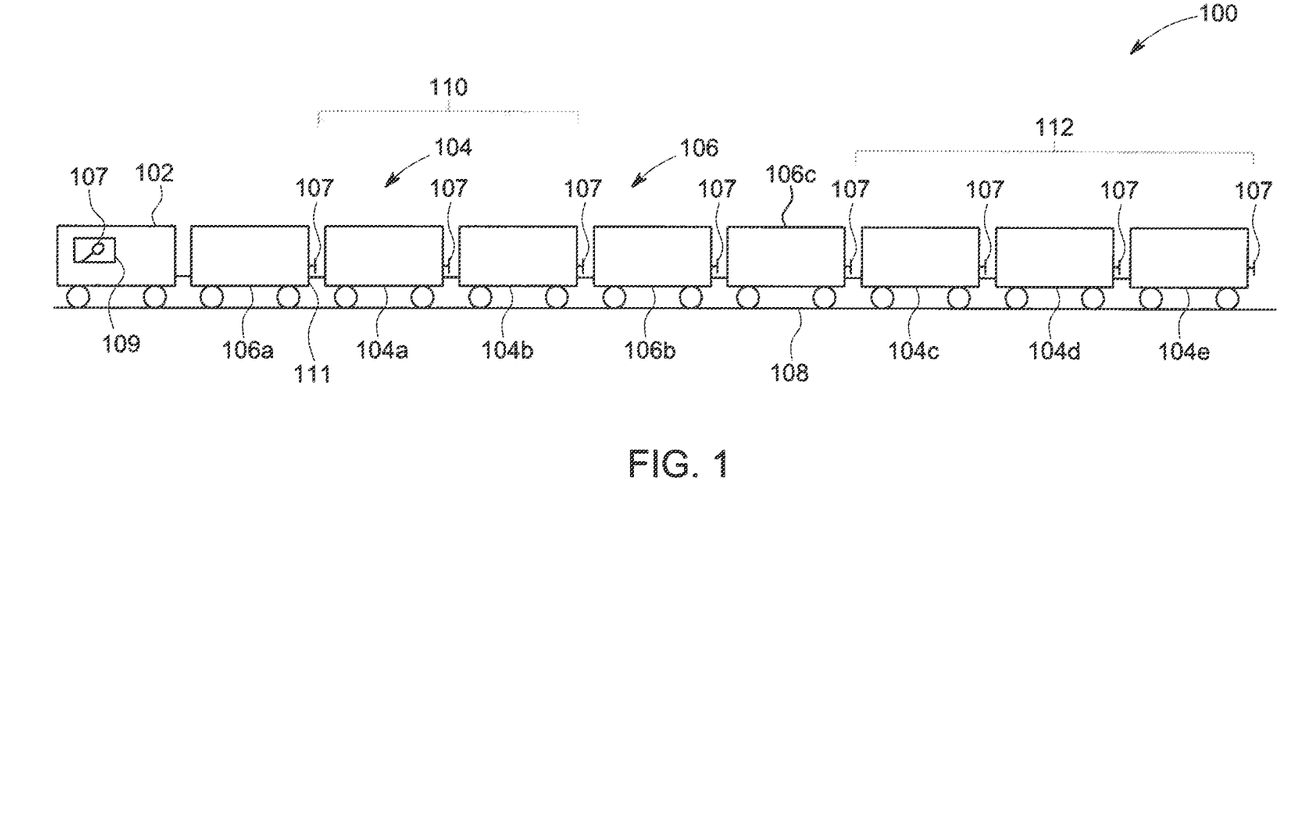
FIG. 1 illustrates a schematic diagram of a vehicle system, according to an embodiment of the present disclosure.

FIG. 1 illustrates a schematic diagram of a vehicle system 100, according to an embodiment of the present disclosure. The vehicle system 100 is shown as being a train, but alternatively may be formed from one or more other types of vehicles. The vehicle system 100 includes a lead vehicle 102 coupled with several remote vehicles 104 and non-powered vehicles 106. Each of the vehicles 102, 104, and 106 includes its own separate and distinct handbrake 107. For example, the lead vehicle 102 may include a handbrake 107 within an operating cabin 109. The vehicles 104 and 106 may include handbrakes 107 operatively secured to an outer portion thereof, such as at a rear end 111. Alternatively, the handbrakes 107 may be within internal cabins or chambers of all of the vehicles 102, 104, and 106. Also, alternatively, the handbrake 107 of the lead vehicle 102 may be outside of the operating cabin 109.

The lead vehicle 102 and the remote vehicles 104 may be referred to as powered vehicles as the lead vehicle 102 and remote vehicles 104 are capable of generating tractive efforts for self propulsion. For example, the lead vehicle 102 and remote vehicles 104 may be locomotives traveling along a route 108 (for example, a track). The non-powered vehicles 106 may be incapable of generating tractive efforts for self propulsion. For example, the non-powered vehicles 106 may be cargo cars that carry goods and/or persons along the route 108. As shown in FIG. 1, the remote vehicles 104 are referred to by the reference number 104 and individually referred to by reference numbers 104a, 104b, 104c, and so on. Similarly, the non-powered vehicles 106 are referred to by the reference number 106 and individually referred to by reference numbers 106a, 106b, and 106c. The number of vehicles 102, 104, 106 shown in FIG. 1 is provided as an example and is not intended to limit all embodiments of the subject matter described herein.

The remote vehicles 104 are arranged in motive power groups to define vehicle consists 110, 112. The remote vehicles 104 in a consist 110 and/or 112 may be mechanically and/or logically linked together to provide tractive effort and/or braking effort to propel and/or stop movement of the vehicle system 100. In at least one embodiment, the lead vehicle 102 coordinates control of the remote vehicles 104 in the consists 110, 112 to control a net or total tractive effort and/or braking effort of the vehicle system 100. For example, the vehicle system 100 may operate in a distributed power (DP) mode of operation where the lead vehicle 102 remotely directs the tractive efforts and/or braking efforts of the remote vehicles 104 in the consists 110, 112 from the lead vehicle 102. In the illustrated embodiment, the lead vehicle 102 is interconnected with, but spaced apart from, the consists 110, 112 by one or more non-powered vehicles 106. Alternatively, the lead vehicle 102 may not be spaced apart from the consists 110 or 112. Instead, the lead vehicle 102 may be directly connected to the consist 110, which may, in turn, be directly connected to the consist 112, without any non-powered vehicles 106 therebetween. The consist 110 may include more powered vehicles 104 than shown, while the consist 112 may include more or less powered vehicles 104 than shown. Also, alternatively, the vehicle system 100 may include more or less consists 110 and 112 than shown. For example, the vehicle system 100 may not include any consists, but, instead, may include the lead vehicle 102 connected to the non-powered vehicles 106.

The lead vehicle 102 and the remote vehicles 104 may be communicatively coupled with each other by one or more wired and/or wireless connections or communication links. As used herein, the term "communicatively coupled" means that two components are able to communicate (e.g., transmit and/or receive) data with each other by wired and/or wireless connections. For example, the lead vehicle 102 may communicate with one or more of the remote vehicles 104 via a wireless network. Alternatively, or additionally, the lead vehicle 102 may be conductively coupled with the remote vehicles 104 by one or more tangible communication pathways, such as conductive wires or cables (e.g., multiple unit or MU cable bus), fiber optic cables, and the like. As described below, the lead vehicles 102 and the remote vehicles 104 may communicate with each other using electrically powered communication devices. The communication devices can include transceivers and/or antennas that communicate data (for example, network or packetized data or non-network data) between each other through one or more of the communication links between the communication devices.

One or more of the communication devices in the consists 110, 112 may be powered by the remote vehicles 104. For example, each of the remote vehicles 104 in the consists 110, 112 may include a propulsion subsystem that generates electric current to, among other things, power traction motors to propel the vehicle system 100 and/or power communication devices disposed on-board the remote vehicles 104. Alternatively, one or more of the communication devices in the consists 110, 112 may be powered from an off-board power source, such as a source of electric current that is not located on the vehicle system 100. For example, the communication devices may receive electric current from a utility power grid via an overhead catenary, a powered third rail, or the like.

Figure 2:
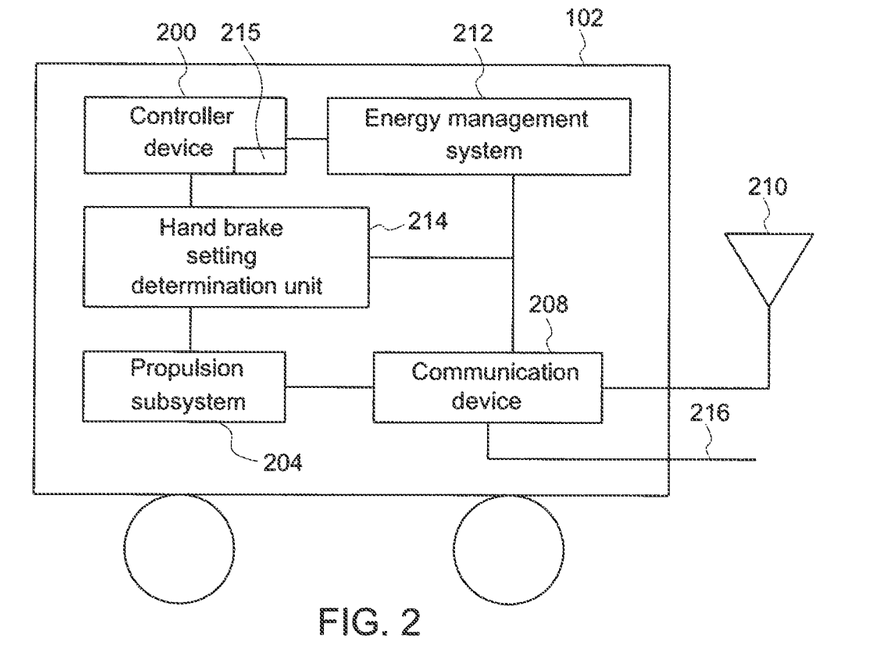
FIG. 2 illustrates a schematic diagram of a lead vehicle, according to an embodiment of the present disclosure.

FIG. 2 illustrates a schematic diagram of the lead vehicle 102, according to an embodiment of the present disclosure. The lead vehicle 102 includes a controller device 200 that forms the control instructions used to direct the tractive efforts and/or braking efforts of the remote vehicles 104 (shown in FIG. 1). For example, the controller device 200 can form data messages that are communicated to the remote vehicles 104 and that direct the remote vehicles 104 to change the tractive efforts and/or braking efforts provided by the remote vehicles 104. The controller device 200 can include one or more input/output devices that enable a human operator to manually control the tractive efforts and/or braking efforts of the lead vehicle 102 and/or remote vehicles 104.

The lead vehicle 102 may also include a handbrake setting determination unit 214 that may be in communication with an energy management system 212. While shown as a separate and distinct component from the energy management system 212, the handbrake setting determination unit 214 may alternatively be an integral part of the energy management system 212 and/or the controller device 200. Based on data received from the energy management system 212, the handbrake setting determination unit 214 determines a suggested number of handbrakes 107 to set in order to ensure that the vehicle system 100 (shown in FIG. 1) remains safely stopped and parked at a particular location on the route 108. (Depending on the data, the suggested number of handbrakes may be one handbrake of the plural handbrakes of a vehicle system, two or more handbrakes but less than all of the plural handbrakes of the vehicle system, or all of the plural handbrakes of the vehicle system.) The handbrake setting determination unit 214 may communicate with the controller device 200 to display a handbrake setting control input, such as a handbrake setting suggestion, on a monitor or other display device 215, which may be operatively connected to the controller device 200, as further described below.

The handbrake setting control input may be or include a handbrake setting suggestion, which may be displayed and/or otherwise communicated (such as through an audio signal) based on the control data or signal input to a user interface. The control input may also be or include data or signal(s) that may not be an explicit suggestion, but may relate to, for example, automatic commands, such as automatic control of brakes. As another example, instead of a suggestion, the handbrake setting control input may include a definite course of action that will be undertaken by the handbrake setting determination unit and/or the vehicle system.

The lead vehicle 102 also includes a propulsion subsystem 204 that provides tractive effort and/or braking effort of the lead vehicle 102. The propulsion subsystem 204 may include an engine that consumes fuel to rotate a shaft connected to an electrical alternator or generator, which generates electric current to power traction motors of the lead vehicle 102. The traction motors can rotate axles and/or wheels of the lead vehicle 102 to propel the lead vehicle 102. The propulsion subsystem 204 can include brakes (for example, air brakes or regenerative/resistive brakes) that slow or stop movement of the lead vehicle 102.

The lead vehicle 102 also includes a communication device 208 that communicates with one or more of the remote vehicles 104 (shown in FIG. 1). For example, the communication device 208 may transmit the control instructions from the controller device 200 to the remote vehicles 104 so that the lead vehicle 102 can control the tractive efforts and/or braking efforts of the remote vehicles 104. The communication device 208 may include a transceiver device or transmitter that is conductively coupled with a communication pathway 216 (for example, a cable bus or MU cable bus). The communication device 208 can communicate the control instructions to the remote vehicles 104 through the communication pathway 216. Alternatively or additionally, the communication device 208 may be coupled with an antenna 210 to wirelessly transmit the control instructions to the remote vehicles 104, such as over a wireless network between the antenna 210 and the remote vehicles 104.

The energy management system 212 is configured to determine the tractive efforts and/or braking efforts of one or more of the remote vehicles 104 (shown in FIG. 1) during a trip of the vehicle system 100 (shown in FIG. 1). A trip of the vehicle system 100 includes the travel of the vehicle system 100 along the route 108 (shown in FIG. 1) from a starting location to a destination location. The trip plan may dictate or establish various tractive efforts and/or braking efforts of the different vehicles in a vehicle system for different portions or segments of the trip of the vehicle system. For example, the trip plan may include different throttle settings and/or brake settings for the lead vehicle 102 and remote vehicles 104 of the vehicle system 100 during various segments of the trip. The trip plan may be based on a trip profile that includes information related to the vehicle system 100, the route 108, the geography over which the route 108 extends, and other information in order to control the tractive efforts and/or braking efforts of one or more of the lead vehicle 102 and/or the remote vehicles 104.

The energy management system 212 can communicate the trip plan with the controller device 200 to change the tractive efforts and/or braking efforts provided by the remote vehicles 104 as the vehicle system 100 travels according to the trip plan. For example, if the vehicle system 100 is approaching a steep incline and the trip profile indicates that the vehicle system 100 is carrying significantly heavy cargo, then the energy management system 212 may direct one or more of the lead vehicle 102 and/or the remote vehicles 104 to increase the tractive efforts supplied by the respective vehicle. Conversely, if the vehicle system 100 is carrying a smaller cargo load based on the trip profile, then the energy management system 212 may direct the lead vehicle 102 and/or remote vehicles 104 to increase the supplied tractive efforts by a smaller amount than the tractive efforts would otherwise be increased if the data indicated a heavier cargo load. The trip plan formed by the energy management system 212 is based on the trip profile, which can include information and factors such as changes in the route 108 (shown in FIG. 1) that the vehicle system 100 (shown in FIG. 1) travels along, regulatory requirements (for example, emission limits) of the regions through which the vehicle system 100 travels, and the like, and based on the trip profile. In at least one embodiment, the energy management system 212 includes a software application such as the Trip Optimizer™ software application provided by General Electric Company, to control propulsion operations of the vehicle system 100 during the trip in order to reduce fuel consumption of the vehicles and/or to reduce wear and tear on the vehicle system 100.

The trip profile can be based on, or include, trip data, vehicle data, route data, and/or updates to the trip data, the vehicle data, and/or the route data. Vehicle data includes information about the vehicles 102, 104 (shown in FIG. 1) and/or cargo being carried by the vehicle system 100 (shown in FIG. 1). For example, vehicle data may represent cargo content (such as information representative of cargo being transported by the vehicle system 100) and/or vehicle information (such as model numbers, fuel efficiencies, manufacturers, horsepower, and the like, of locomotives and/or other railcars in the vehicle system 100).

Trip data includes information about an upcoming trip by the vehicle system 100 (shown in FIG. 1). By way of example only, trip data may include a trip profile of an upcoming trip of the vehicle system 100 (such as information that can be used to control one or more operations of the vehicles 102, 104, such as tractive and/or braking efforts provided during an upcoming trip), station information (such as the location of a beginning station where the upcoming trip is to begin, the location of refueling stops or locations, and/or the location of an ending station where the upcoming trip is to end), restriction information (such as work zone identifications, or information on locations where the route is being repaired or is near another route being repaired and corresponding speed/throttle limitations on the vehicle system 100), and/or operating mode information (such as speed/throttle limitations on the vehicle system 100 in various locations, slow orders, and the like).

Route or position data includes information about the route 108 (shown in FIG. 1) upon which the vehicle system 100 (shown in FIG. 1) travels. The route data may alternatively be referred to as map data. For example, the route data can include information about locations of damaged sections of the route 108, locations of sections of the route 108 that are under repair or construction, the curvature and/or grade of the route 108, GPS coordinates of the route 108, and the like. The route data is related to operations of the vehicle system 100 as the route data includes information about the route 108 that the vehicle system 100 is or will be traveling on.

The energy management system 212 communicates the trip data and/or the route or position data to the handbrake setting determination unit 214. After receiving the trip data and/or the position or route data, the handbrake setting determination unit 214 operates to determine a number of handbrakes 107 (shown in FIG. 1) to set in order to ensure that the vehicle system 100 remains (or will remain) safely stopped or parked at a particular location along the route 108.

The energy management system 212 may also provide location data for the vehicle system 100. For example, the energy management system 212 may include a location-determining device, such as a GPS device, that is used to determine a precise location of the vehicle system 100 along the route 108. Optionally, the location-determining device may be separate and distinct from the energy management system 212 and in communication with the handbrake setting determination unit 214 and/or the energy management system 212.

The energy management system 212 also stores vehicle data of the vehicle system 100. For example, the vehicle data may include the number of powered and unpowered vehicles within the vehicle system 100, the weight (such as tonnage) of the vehicle system, the length of the vehicle system, the weight of cargo being carried by the vehicle system 100, and the like. In short, the vehicle data may include data related to the weight, configuration, length, and the like of the vehicle system 100.

Referring to FIGS. 1 and 2, while the energy management system 212 and the handbrake setting determination unit 214 are shown on the lead vehicle 102, the energy management system 212 and the handbrake setting determination unit 214 may alternatively be located in or more of the remote vehicles 104. For example, each powered vehicle within the vehicle system 100 may include an energy management system 212 and a handbrake setting determination unit 214. Depending on a location of an operator(s) within the vehicle system 100, one or more of the energy management system 212 and the handbrake setting determination unit 214 may be operational. For example, if operators are in the lead vehicle 102 and the remote vehicle 104e, energy management systems and handbrake setting determination units within the vehicles 102 and 104e may be operational, while the rest remain idle or powered off.

Also, alternatively, the handbrake setting determination unit 214 may be remotely located from the lead vehicle 102 and even the vehicle system 100 (shown in FIG. 1). For example, the handbrake setting determination unit 214 may be located in a central location (such as a station along a route), and/or one or more remote locations, and may be in communication with the energy management system 212. Thus, the handbrake setting determination unit 214 may be onboard the vehicle system 100 and/or remotely located therefrom.

The handbrake setting determination unit 214 receives data parameters, such as one or more of the trip data, the position or route data, the location data, the vehicle data, and the like, such as from the energy management system 212. Based on the received data parameters, the handbrake setting determination unit 214 outputs a handbrake setting suggestion, which may be displayed on the monitor or other display device 215. The handbrake setting suggestion includes a suggested number of handbrakes of the vehicle system 100 in order to ensure that the vehicle system 100 will remain safely stopped and parked at a particular location along the route 108.

After displaying the handbrake setting suggestion, the handbrake setting determination unit 214 may prompt an operator to confirm receipt of the handbrake setting suggestion. Once receipt is confirmed, the handbrake setting determination unit 214 may then query the operator as to whether the handbrake suggestion is to be heeded. For example, the handbrake setting determination unit 214 may prompt the operator to indicate whether the handbrake suggestion has been followed or declined. The operator's response is then stored in memory, which may be included in the handbrake determination unit 214, and cross-referenced with actual handbrake setting data from each of the vehicles within the vehicle determination unit to determine whether the handbrake suggestions was, in fact, followed. For example, the communication device 208 may receive actual handbrake setting data from each of the vehicles within the vehicle system 100 to determine whether or not handbrakes have actually been set, despite whether the operator indicated that the handbrake suggestion was followed or declined. The operator's response to the handbrake suggestion and the actual handbrake setting data are then stored in memory (and may be time stamped, for example). In this manner, if the vehicle system 100 does not remain stationary, the stored data may be checked to determine whether the operator actually followed the handbrake setting suggestion or not.

After the operator responds to the handbrake setting suggestion, the handbrake setting determination unit 214 may further prompt the operator to verify that the suggested number of set handbrakes actually maintains the vehicle system 100 in a parked position. For example, the handbrake determination unit 214 may display a message on the monitor or other display device 215 to verify sufficient handbrake force through engine operation at particular levels and/or disengagement of air brakes that are separate and distinct from the handbrakes. If operation of the engine, to provide tractive effort, for example, at a particular level does not result in the vehicle system 100 moving, then the operator may confirm that a sufficient number of handbrakes are set. If however, operation of the engine at the particular level causes the vehicle system 100 to move, the handbrake setting determination unit 214 may display an alert message indicating that additional handbrakes should be set.

Figure 3:
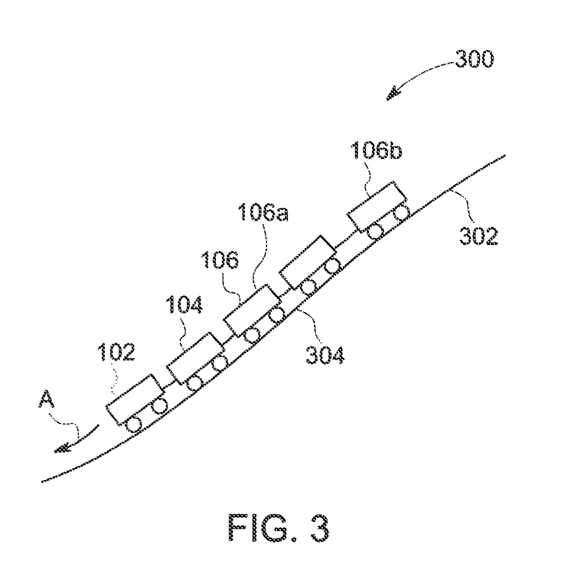
FIG. 3 illustrates a schematic diagram of a vehicle system on a graded portion of a route, according to an embodiment of the present disclosure.

FIG. 3 illustrates a schematic diagram of a vehicle system 300 on an inclined or graded portion 302 of a route 304, according to an embodiment of the present disclosure. The vehicle system 300 may include the lead vehicle 102 and one or more remote powered vehicle 104 and unpowered vehicles 106. Each of the vehicles 102, 104, and 106 within the vehicle system 300 may include a handbrake, as described above.

Referring to FIGS. 2 and 3, the energy management system 212 determines the location data of the vehicle system 300 along the route 304. Based on the location data, the energy management system 212 determines the grade of the graded portion 302 by accessing the position or route data. For example, the actual location of the vehicle system 300 along the route allows the energy management system 212, for example, to determine the grade of the route at that position. The handbrake setting determination unit 214 may receive the data parameters, such as the route, location, and/or vehicle data, to determine a number of handbrakes to set.

The handbrake setting determination unit 214 may analyze data related to the steepness of the graded portion 302 (determined through the position or route data), the length of the vehicle system 300, the weight of the vehicle system 300, and the like to determine the handbrake setting suggestion. For example, with increased grade, the handbrake setting determination unit 214 increases the suggested number of handbrakes to set. Also, the handbrake setting determination unit 214 may increase or decrease the handbrake setting suggestion based on vehicle data, such as the length and weight of the vehicle system 300. For example, a relatively short and heavy vehicle system on a particular grade may generate a higher handbrake setting suggestion than a relatively long and light vehicle system on the particular grade.

After the handbrake setting determination unit 214 determines the handbrake setting suggestion based on the one or more data parameters, the handbrake setting determination unit 214 displays the suggestion on the monitor or other display device 215. The handbrake setting determination unit 214 may then prompt the operator to acknowledge receipt of the handbrake setting suggestion. After the operator acknowledges receipt, the handbrake setting determination unit 214 may then display a question on the monitor or other display device 215 as to whether the operator will follow or decline the handbrake setting suggestion. The operator's response is then stored in memory. If the operator indicates that the suggestion is to be followed, the handbrake setting determination unit 214 may then communicate with the other vehicles within the vehicle system 300 via the communication device 208 to determine whether or not the suggested number of handbrakes have actually been set. The actual handbrake setting data may then be stored in memory for future reference. The handbrake setting determination unit 214 may then display a message on the monitor or other display device 215 regarding verification that the handbrake setting suggestion is sufficient to maintain the vehicle system 300 in a safe, parked position on the graded portion 302 of the route 304. The operator may verify through attempted movement of the vehicle system 300 (such as through engine operation at a particular motive force) in the downhill direction of arrow A with the suggested number of handbrakes set. If the vehicle system 300 remains stationary, the operator may verify that the handbrake setting suggestion is sufficient. If, however, the vehicle system 300 begins to move downhill in the direction of arrow A, the operator may indicate that the handbrake setting suggestion is insufficient, and the handbrake setting determination unit 214 may recalculate a handbrake setting suggestion (or the operator may simply set a desired number of additional handbrakes).

The total number of handbrakes to be set may be the first corresponding number of vehicles within the vehicle system 300. For example, a handbrake setting suggestion of three may be with respect to the first three vehicles within the vehicle system 300. Alternatively, the handbrake setting suggestion may be with respect to any of the vehicles. For example, a handbrake setting suggestion of three may be with respect to any three handbrakes of any three of the vehicles within the vehicle system 300.

Alternatively, the handbrake setting determination unit 214 may output a handbrake setting suggestion that indicates a number and location of handbrakes to set. For example, the handbrake setting suggestion may indicate that a total of three handbrakes of the lead vehicle 102, a middle vehicle 106a, and a trailing vehicle 106b are to be set. The handbrake determination unit 214 may determine the number and location of the handbrakes to set in order to provide maximum stopping force with minimal handbrakes, for example.

The handbrakes may be manually set, such as by an operator manipulating each handbrake. Alternatively, the handbrakes may be automatically set. For example, the lead unit 102 may be in communication with an actuating assembly operatively connected to each handbrake of the vehicle system 300. The operator may communicate with each actuating assembly through the communication device 208 to selectively set and disengage each of the handbrakes.

The handbrake setting determination unit 214 and the energy management system 212 may form, or be part of, one or more computers, circuitry, modules, and/or the like. As used herein, the term "computer" or "module" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer" or "module."

The computer or processor executes a set of instructions that are stored in one or more storage elements, in order to process data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the handbrake setting determination unit 214 and the energy management system 212 may represent circuit modules that may be implemented as hardware with associated instructions (for example, software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the modules may represent processing circuitry such as one or more field programmable gate array (FPGA), application specific integrated circuit (ASIC), or microprocessor. The circuit modules in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

Figure 4:
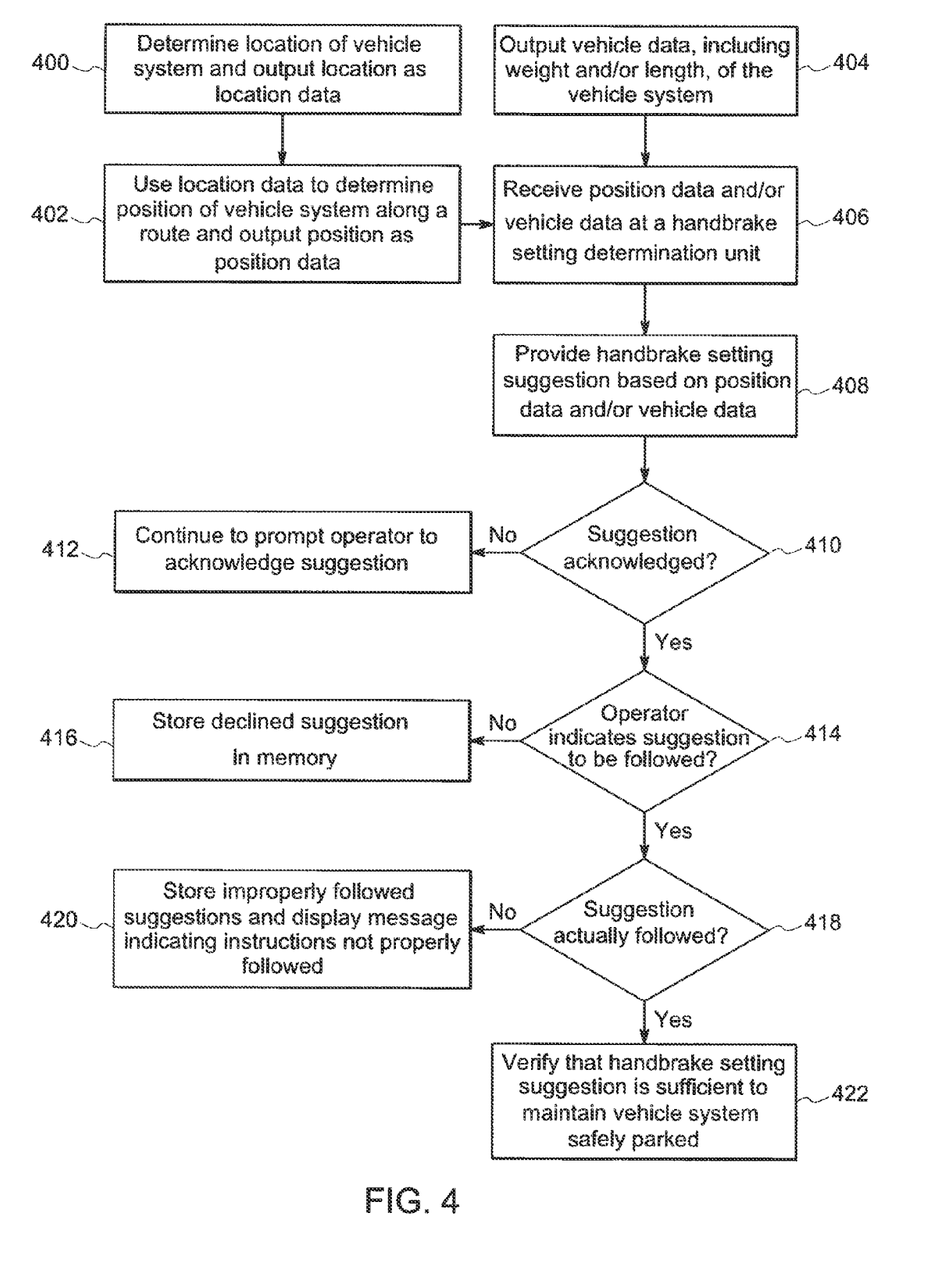
FIG. 4 illustrates a flow chart of a method of setting handbrakes based on a handbrake setting suggestion, according to an embodiment of the present disclosure.

FIG. 4 illustrates a flow chart of a method of setting handbrakes based on a handbrake setting suggestion, according to an embodiment of the present disclosure. The method begins at 400, in which a location of a vehicle system is determined and output as location data. For example, the vehicle system may include a GPS unit that is able to determine the precise location of the vehicle system, which may be output to the energy management system.

At 402, the energy management system uses the location data to determine a position of the vehicle system along a route and output the position on the route as position data. At 404, the energy management system may also output vehicle data, including weight, length, number of vehicles within the system, and the like. Steps 402 and 404 may be concurrent, or may occur at different times.

At 406, a handbrake setting determination unit receives the position data and/or the vehicle data. The handbrake setting determination unit provides a handbrake setting suggestion based on the position data and/or the vehicle data at 408.

At 410, the handbrake setting determination unit may determine whether the suggestion is acknowledged. For example, the handbrake setting determination unit may prompt an operator to acknowledge the suggestion through a displayed message on a monitor or other display device. If the operator does not acknowledge the suggestion, the method continues to 412, in which the handbrake setting determination unit continues to prompt the operator to acknowledge the suggestion. If, however, the suggestion is acknowledged, the method continues to 414, in which the handbrake setting determination unit queries the operator as to whether the operator will follow or decline the suggestion. Alternatively, 410 and 412 may be omitted, and the method may proceed from 408 directly to 414.

If the operator declines the suggestion, the declined suggestion is stored in a memory, such as within the handbrake setting determination unit, at 416. If, however, the operator indicates that the suggestion is to be followed, the method continues to 418, in which the handbrake setting determination unit determines whether the suggestion was actually followed. For example, the handbrake setting determination unit may communicate with handbrake systems of each of the vehicles within a vehicle system to determine whether or not they have been set. Alternatively, 410, 412, 414, and 416 may be omitted, and the method may proceed directly from 408 to 418.

If the handbrake setting suggestion was not actually followed (such as when an operator indicates that the suggestion would be followed, but the handbrake setting determination unit detects that the actual number of handbrakes suggested to be set have not been set), the method proceeds to 420, in which a flag indicating improperly followed suggestions is stored, and a message is displayed to the operator that the instructions were not properly followed. If, however, the suggestion was actually followed, the method proceeds from 418 to 422, in which the handbrake setting determination unit instructs the operator to verify that the handbrake setting suggestion is sufficient to maintain the vehicle system in a safely stopped or parked position. The handbrake setting determination unit may monitor the verification process and re-calculate a handbrake setting suggestion if the original suggestion is insufficient to maintain the vehicle system in a safely stopped or parked position.

Alternatively, steps 410-422 may be omitted. As such, in at least one embodiment, the handbrake setting determination unit may simply provide a handbrake setting suggestion to an operator.

As described above, embodiments of the present disclosure provide systems and method for a number of handbrakes to set in order to ensure that a vehicle system remains safely stopped and parked. Embodiments of the present disclosure provide systems and methods that reduce the possibility of human error in determining a number of handbrakes to set. In general, embodiments of the present disclosure provide systems and method for accurately determining a number of handbrakes to set within a vehicle system in order to ensure that the vehicle system remains safely stopped and parked.

Embodiments of the present disclosure provide a handbrake setting determination unit that uses data output and/or otherwise stored in an energy management system to account for train makeup, including car details, length, weight, and the like, as well as the incline or grade of track at which a vehicle system is stopped in order to calculate or otherwise determine a number of handbrakes to set. The handbrake setting determination unit may also prompt an operator to confirm whether the suggestion has been followed. As such, the guesswork of setting handbrakes in unfamiliar territory is reduced or otherwise minimized. Moreover, the handbrake setting determination unit may also store, log, and time stamp decisions and actions taken by the operator with respect to the setting of handbrakes, thereby providing a verifiable trail of evidence for future reference.

As described above, certain embodiments of the present disclosure provide a system that may include a vehicle system including at least one vehicle, wherein the at least one vehicle includes at least one handbrake. The system also includes a handbrake setting determination unit configured to determine a handbrake setting suggestion indicating whether the at least one handbrake is to be set in order to safely park the vehicle system at a particular location.

In at least one embodiment, the handbrake setting determination unit is configured to determine the handbrake setting suggestion based on one or more data parameters including one or both of position data or vehicle data of the vehicle system. For example, the position data may include a position of the vehicle system along a route, and the vehicle data may include one or more of a weight, length, and number of vehicles of the vehicle system. As another example, the position data may include a grade of a surface on which the vehicle system is positioned.

The system may also include an energy management system in communication with the handbrake setting determination unit. The energy management system may be configured to provide one or more data parameters of the vehicle system to the handbrake setting determination unit. The handbrake setting determination unit may be configured to determine the handbrake setting suggestion based on the one or more data parameters.

In at least one embodiment, the handbrake setting determination unit is configured to output the handbrake setting suggestion to an operator and request acknowledgement of the handbrake setting suggestion. For example, the handbrake setting suggestion may be output as a text message on a monitor or other display device, or as an audio signal broadcast through a speaker.

In at least one embodiment, the handbrake setting determination unit is configured to determine a decision of an operator as to whether the operator intends to follow or decline the handbrake setting suggestion. The handbrake setting determination unit may be configured to store the decision of the operator in a memory, which may be part of the handbrake setting determination unit.

In at least one embodiment, the handbrake setting determination unit may be configured to determine whether an operator has actually followed the handbrake setting suggestion. For example, the system may include a communication device in communication with the handbrake setting determination unit and the at least one handbrake. The handbrake setting determination unit may be configured to communicate with the at least one handbrake through the communication device to determine whether the at least one handbrake has been set.

In at least one embodiment, the handbrake setting determination unit may be configured to prompt an operator to verify that the handbrake setting suggestion is sufficient to safely park the vehicle system at the particular location. For example, the operator may be prompted to run an engine at a particular forward speed (and/or release air brakes) with the handbrakes set to determine whether the vehicle system moves. If the vehicle system does not move, the handbrake setting suggestion is sufficient to safely park the vehicle system at the particular location.

In at least one embodiment, the vehicle system includes a train. The at least one vehicle may include at least one locomotive and at least one freight or passenger car. In at least one embodiment, the at least one locomotive includes a lead locomotive and at least one remote locomotive. The at least one powered locomotive may include first and second powered locomotives of a consist.

In another embodiment where the vehicle system includes a train having plural handbrakes, the handbrake setting determination unit is configured to determine the handbrake setting control input indicating how many of the plural handbrakes are to be set in order to park the train at the particular location without the train moving.

The handbrake setting determination unit may be onboard the vehicle system. Alternatively, the handbrake setting determination unit may be remotely located from the vehicle system.

Certain embodiments of the present disclosure provide a method that may include receiving one or more data parameters from a vehicle system including at least one vehicle, wherein the at least one vehicle includes at least one handbrake, using a handbrake setting determination unit to receive the one or more data parameters, and determining a handbrake setting suggestion with the handbrake setting determination unit based on the one or more data parameters. The handbrake setting suggestion indicates whether the at least one handbrake is to be set in order to safely park the vehicle system at a particular location. The determining a handbrake setting suggestion may be based on the one or more data parameters. The one or more data parameters may include one or both of position data or vehicle data of the vehicle system. The position data may include a position of the vehicle system along a route, and the vehicle data may include one or more of a weight, length, and number of vehicles of the vehicle system. The position data may include a grade of a surface on which the vehicle system is positioned.

The method may also include using an energy management system to communicate with the handbrake setting determination unit, and providing one or more data parameters of the vehicle system from the energy management system to the handbrake setting determination unit.

In at least one embodiment, the method may include outputting the handbrake setting suggestion from the handbrake setting determination unit to a monitor or other display device, and using the handbrake setting determination unit to request acknowledgement of the handbrake setting suggestion. In at least one embodiment, the method may include using the handbrake setting determination unit to determine a decision of an operator as to whether the operator intends to follow or decline the handbrake setting suggestion. In at least one embodiment, the decision may be stored in a memory.

In at least one embodiment, the method may include using the handbrake setting determination unit to determine whether an operator has actually followed the handbrake setting suggestion. For example, the method may include communicating with the at least one handbrake through a communication device to determine whether the at least one handbrake has been set.

In at least one embodiment, the method may include using the handbrake setting determination unit to prompt an operator to verify that the handbrake setting suggestion is sufficient to safely park the vehicle system at the particular location.

In another embodiment of the method, the vehicle system includes a train, the at least one vehicle of the vehicle system comprises at least one locomotive and at least one freight or passenger car of the train, and the at least one handbrake comprises plural handbrakes of the train. The handbrake setting control input indicates how many of the plural handbrakes are to be set in order to park the train at the particular location without moving.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the disclosure without departing from its scope. While the dimensions and types of materials described herein are intended to define the parameters of the disclosed subject matter, they are by no means limiting and are exemplary embodiments. Many other embodiments will be apparent to one of ordinary skill in the art upon reviewing the above description. The scope of the disclosed subject matter should, therefore, be determined with reference to the appended claims, along with the full scope of equivalents to which such claims are entitled. In the appended claims, the terms "including," "includes," and "in which" are used as the plain-English equivalents of the respective terms "comprising," "comprises," and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f) unless and until such claim limitations expressly use the phrase "means for" followed by a statement of function void of further structure.

This written description uses examples to disclose several embodiments of the disclosure, and also to enable a person of ordinary skill in the art to practice the embodiments of disclosure, including making and using any devices or systems and performing any incorporated methods. The patentable scope of the disclosure is defined by the claims, and may include other examples that occur to a person of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods, without departing from the spirit and scope of the disclosure herein involved, it is intended that all of the subject matter of the above description or shown in the accompanying drawings shall be interpreted merely as examples illustrating the inventive concept herein and shall not be construed as limiting the disclosure.

What is claimed is:

1. A system comprising:
a handbrake setting determination unit configured to determine a handbrake setting control input indicating whether at least one handbrake of a vehicle system is to be set in order to park the vehicle system at a particular location without the vehicle system moving; and
an energy management system in communication with the handbrake setting determination unit, wherein the energy management system is configured to provide one or more data parameters of the vehicle system to the handbrake setting determination unit, and wherein the handbrake setting determination unit is configured to determine the handbrake setting control input based on the one or more data parameters.

2. The system of claim 1, wherein the data parameters include one or both of position data or vehicle data of the vehicle system.

3. The system of claim 2, wherein the position data includes a position of the vehicle system along a route, and wherein the vehicle data includes one or more of a weight, length, or number of vehicles of the vehicle system.

4. The system of claim 2, wherein the position data includes a grade of a surface on which the vehicle system is positioned.

5. The system of claim 1, wherein the handbrake setting determination unit is configured to generate a handbrake setting suggestion based on the handbrake setting control input, output the handbrake setting suggestion to an operator, and request acknowledgement of the handbrake setting suggestion.

6. The system of claim 1, wherein the handbrake setting determination unit is configured to generate a handbrake setting suggestion based on the handbrake setting control input, output the handbrake setting suggestion to an operator, and determine a decision of the operator as to whether the operator intends to follow or decline the handbrake setting suggestion.

7. The system of claim 1, wherein the handbrake setting determination unit is configured to generate a handbrake setting suggestion based on the handbrake setting control input, output the handbrake setting suggestion to an operator, and determine whether the operator has actually followed the handbrake setting suggestion.

8. The system of claim 7, further comprising a communication device in communication with the handbrake setting determination unit and the at least one handbrake, wherein the handbrake setting determination unit is configured to communicate with the at least one handbrake through the communication device to determine whether the at least one handbrake has been set.

9. The system of claim 1, wherein the handbrake setting determination unit is configured to generate a handbrake setting suggestion based on the handbrake setting control input, output the handbrake setting suggestion to an operator, and prompt an operator to verify that the handbrake setting suggestion is sufficient to park the vehicle system at the particular location without moving.

10. The system of claim 1, wherein:
the vehicle system comprises a train having at least one locomotive, at least one freight or passenger car, and plural handbrakes; and
the handbrake setting determination unit is configured to determine the handbrake setting control input indicating how many of the plural handbrakes are to be set in order to park the train at the particular location without the train moving.

11. The system of claim 1, wherein the vehicle system comprises air brakes that are separate and distinct from the at least one handbrake.

12. The system of claim 1, wherein the energy management system is configured to determine a trip plan for the vehicle system, the trip plan including at least one of throttle settings or brake settings for vehicle system during a trip of the vehicle system.

13. The system of claim 1, wherein the handbrake setting determination unit is integral with the energy management system.

14. A method comprising:
receiving, at a handbrake setting determination unit, one or more data parameters from a vehicle system including at least one vehicle, wherein the at least one vehicle includes at least one handbrake; and
determining a handbrake setting control input with the handbrake setting determination unit based on the one or more data parameters, wherein the handbrake setting control input indicates whether the at least one handbrake is to be set in order to park the vehicle system at a particular location without moving;

wherein the vehicle system further includes an energy management system, and at least one of the one or more data parameters are received by the handbrake setting determination unit from the energy management system.

15. The method of claim 14, wherein the one or more data parameters include one or both of position data or vehicle data of the vehicle system.

16. The method of claim 15, wherein the position data includes a position of the vehicle system along a route, and wherein the vehicle data includes one or more of a weight, length, or number of vehicles of the vehicle system.

17. The method of claim 15, wherein the position data includes a grade of a surface on which the vehicle system is positioned.

18. The method of claim 14, further comprising:
outputting a handbrake setting suggestion from the handbrake setting determination unit to a display device, wherein the handbrake setting suggestion is based on the handbrake setting control input; and
using the handbrake setting determination unit to request acknowledgement of the handbrake setting suggestion.

19. The method of claim 14, further comprising:
outputting a handbrake setting suggestion to an operator based on the handbrake setting control input; and
using the handbrake setting determination unit to determine a decision of an operator as to whether the operator intends to follow or decline the handbrake setting suggestion.

20. The method of claim 14, further comprising:
outputting a handbrake setting suggestion to an operator based on the handbrake setting control input; and
using the handbrake setting determination unit to determine whether the operator has actually followed the handbrake setting suggestion.

21. The method of claim 20, further comprising communicating with the at least one handbrake through a communication device to determine whether the at least one handbrake has been set.

22. The method of claim 14, further comprising:
outputting a handbrake setting suggestion to an operator based on the handbrake setting control input; and
using the handbrake setting determination unit to prompt an operator to verify that the handbrake setting suggestion is sufficient to park the vehicle system at the particular location without moving.

23. The method of claim 14, wherein:
the vehicle system includes a train, the at least one vehicle comprises at least one locomotive and at least one freight or passenger car of the train, and the at least one handbrake comprises plural handbrakes of the train; and
the handbrake setting control input indicates how many of the plural handbrakes are to be set in order to park the train at the particular location without moving.

24. The method of claim 14, further comprising the energy management system determining a trip plan for the vehicle system, the trip plan including at least one of throttle settings or brake settings for vehicle system during a trip of the vehicle system.

* * * * *